United States Patent
He et al.

(10) Patent No.: US 11,863,488 B2
(45) Date of Patent: Jan. 2, 2024

(54) SINGLE REFERENCE SIGNAL TIMING INFORMATION FOR MEASUREMENTS OF MULTIPLE REFERENCE SIGNALS OF MULTIPLE CELLS

(71) Applicant: QUALCOMM Incorporated, San Diego, CA (US)

(72) Inventors: Qunfeng He, San Diego, CA (US); Awlok Singh Josan, San Francisco, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/239,051

(22) Filed: Apr. 23, 2021

(65) Prior Publication Data

US 2021/0336742 A1    Oct. 28, 2021

Related U.S. Application Data

(60) Provisional application No. 63/015,782, filed on Apr. 27, 2020.

(51) Int. Cl.
| | |
|---|---|
| *H04W 72/044* | (2023.01) |
| *H04L 5/00* | (2006.01) |
| *H04W 36/00* | (2009.01) |
| *H04W 72/56* | (2023.01) |

(52) U.S. Cl.
CPC ....... *H04L 5/0051* (2013.01); *H04W 36/0088* (2013.01); *H04W 72/044* (2013.01); *H04W 72/56* (2023.01)

(58) Field of Classification Search
CPC .... H04L 5/0051; H04L 5/0094; H04W 36/08; H04W 36/0085; H04W 36/0088; H04W 72/044; H04W 7/086
See application file for complete search history.

(56) References Cited

U.S. PATENT DOCUMENTS

| | | | |
|---|---|---|---|
| 11,546,200 B2 * | 1/2023 | Kim ...................... | H04W 56/00 |
| 2014/0064135 A1 * | 3/2014 | Chen ................... | H04W 72/085 |
| | | | 370/328 |

(Continued)

OTHER PUBLICATIONS

Huawei, et al., "Discussion on CSI-RS Based L3 Measurement Requirements and Scheduling," 3GPP Draft, 3GPP TSG-RAN WG4 Meeting #94-e, R4-2001658, 3rd Generation Partnership Project (3GPP), Mobile Competence Centre, 650, Route Des Lucioles, F-06921, Sophia-Antipolis Cedex, France, vol. RAN WG4. No. Online, Feb. 24, 2020-Mar. 6, 2020, Feb. 14, 2020 (Feb. 14, 2020), XP051851548, 4 pages, Retrieved from the Internet: URL: https://ftp.3gpp.org/tsg_ran/WG4_Radio/TSGR4_94_e/Docs/R4-2001658.zip R4-2001658.doc [retrieved on Feb. 14, 2020], section 2 p. 4.

(Continued)

*Primary Examiner* — Siu M Lee
(74) *Attorney, Agent, or Firm* — Arun Swain

(57) ABSTRACT

Various aspects of the present disclosure generally relate to wireless communication. In some aspects, a user equipment may receive an indication of a single reference signal to use for determining timing information for measuring multiple reference signals from multiple cells on a common frequency layer; and measure the multiple reference signals based at least in part on the timing information. Numerous other aspects are provided.

30 Claims, 9 Drawing Sheets

(56) References Cited

U.S. PATENT DOCUMENTS

| | | | | |
|---|---|---|---|---|
| 2016/0316374 | A1* | 10/2016 | Xu | H04W 16/14 |
| 2018/0302819 | A1* | 10/2018 | Lee | H04B 7/0632 |
| 2018/0368088 | A1* | 12/2018 | Nagaraja | H04L 5/0048 |
| 2018/0376438 | A1* | 12/2018 | Islam | H04W 56/001 |
| 2019/0082346 | A1* | 3/2019 | Tang | H04B 7/0626 |
| 2019/0082401 | A1* | 3/2019 | Han | H04W 76/27 |
| 2019/0200309 | A1* | 6/2019 | Zeng | H04W 88/023 |
| 2020/0052942 | A1* | 2/2020 | Lin | H04W 36/0088 |
| 2020/0214082 | A1* | 7/2020 | Luo | H04W 24/10 |
| 2020/0329407 | A1* | 10/2020 | Su | H04W 36/0058 |
| 2021/0051733 | A1* | 2/2021 | Lee | H04W 24/10 |
| 2021/0337497 | A1* | 10/2021 | Siomina | H04J 11/0079 |
| 2021/0377892 | A1* | 12/2021 | Chen | H04L 5/0051 |
| 2022/0377683 | A1* | 11/2022 | Myung | H04L 5/0048 |

OTHER PUBLICATIONS

Huawei, et al., "Measurement Based on CSI-RS for L3 Mobility," 3GPP Draft, 3GPP TSG RAN WG1 Meeting #90, R1-1713729, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017 (Aug. 20, 2017), XP051316528, 6 pages, Retrieved from the Internet: URL:http://www.3gpp.org/ftp/Meetings_3GPP_SYNC/RAN1/Docs/ [retrieved on Aug. 20, 2017] section 2.1.

International Search Report and Written Opinion—PCT/US2021/070453—ISA/EPO—dated Aug. 16, 2021.

LG Electronics: "Maintenance for Mobility Procedure," 3GPP Draft, 3GPP TSG RAN WG1 Meeting #94, R1-1808484 LG RRM & RLM, 3rd Generation Partnership Project (3GPP), Mobile Competence Centre, 650, Route Des Lucioles, F-06921, Sophia-Antipolis Cedex, France, vol. RAN WG1. No. Gothenburg, Sweden, Aug. 20, 2018-Aug. 24, 2018, Aug. 11, 2018 (Aug. 11, 2018), XP051515862, 5 pages, Retrieved from the Internet: URL: http://www.3gpp.org/ftp/tsg%5Fran/WG1%5FRL1/TSGR1%5F94/Docs/R1%2D1808484%2Ezip [retrieved on Aug. 11, 2018] section 2.3.

* cited by examiner

SINGLE REFERENCE SIGNAL TIMING INFORMATION FOR MEASUREMENTS OF MULTIPLE REFERENCE SIGNALS OF MULTIPLE CELLS

CROSS-REFERENCE TO RELATED APPLICATION

This Patent Application claims priority to Provisional Patent Application No. 63/015,782, filed on Apr. 27, 2020, entitled "SINGLE REFERENCE SIGNAL TIMING INFORMATION FOR MEASUREMENTS OF MULTIPLE REFERENCE SIGNALS OF MULTIPLE CELLS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for single reference signal timing information for measurements of multiple reference signals of multiple cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include receiving an indication of a single reference signal to use for determining timing information for measuring multiple reference signals from multiple cells on a common frequency layer; and measuring the multiple reference signals based at least in part on the timing information.

In some aspects, a method of wireless communication, performed by a base station, may include determining a single reference signal for a user equipment (UE) to use for determining timing information for measuring multiple reference signals from multiple cells on a common frequency layer; and transmitting, to the UE, an indication of the single reference signal.

In some aspects, a UE for wireless communication may include a memory and one or more processors operatively coupled to the memory. The memory and the one or more processors may be configured to receive an indication of a single reference signal to use for determining timing information for measuring multiple reference signals from multiple cells on a common frequency layer; and measure the multiple reference signals based at least in part on the timing information.

In some aspects, a base station for wireless communication may include a memory and one or more processors operatively coupled to the memory. The memory and the one or more processors may be configured to determine a single reference signal for a UE to use for determining timing information for measuring multiple reference signals from multiple cells on a common frequency layer; and transmit, to the UE, an indication of the single reference signal.

In some aspects, a non-transitory computer-readable medium may store one or more instructions for wireless communication. The one or more instructions, when executed by one or more processors of a UE, may cause the one or more processors to receive an indication of a single reference signal to use for determining timing information for measuring multiple reference signals from multiple cells on a common frequency layer; and measure the multiple reference signals based at least in part on the timing information.

In some aspects, a non-transitory computer-readable medium may store one or more instructions for wireless communication. The one or more instructions, when executed by one or more processors of a base station, may cause the one or more processors to determine a single reference signal for a UE to use for determining timing information for measuring multiple reference signals from multiple cells on a common frequency layer; and transmit, to the UE, an indication of the single reference signal.

In some aspects, an apparatus for wireless communication may include means for receiving an indication of a single reference signal to use for determining timing information for measuring multiple reference signals from multiple cells on a common frequency layer; and means for measuring the multiple reference signals based at least in part on the timing information.

In some aspects, an apparatus for wireless communication may include means for determining a single reference signal for a UE to use for determining timing information for measuring multiple reference signals from multiple cells on a common frequency layer; and means for transmitting, to the UE, an indication of the single reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
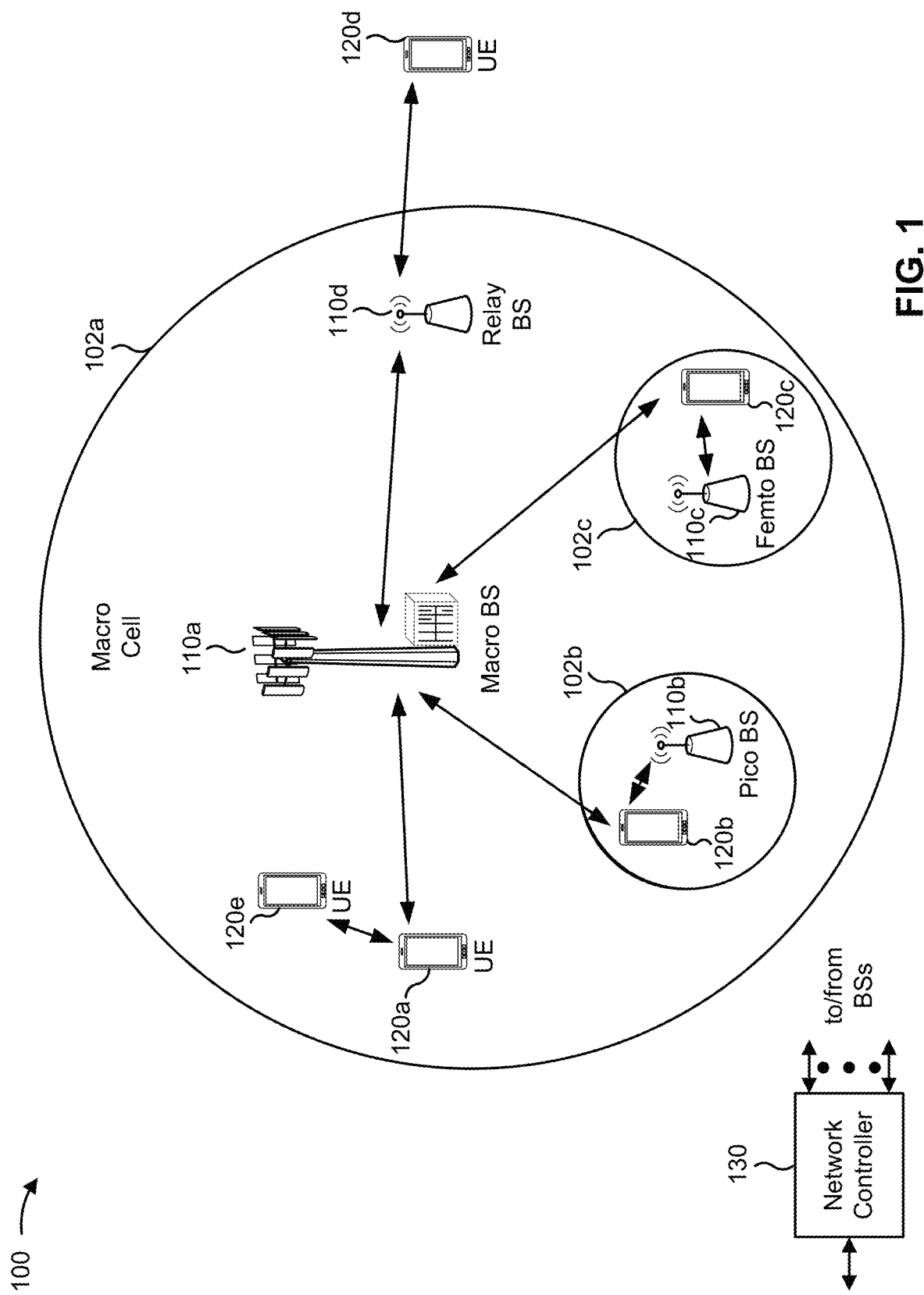
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
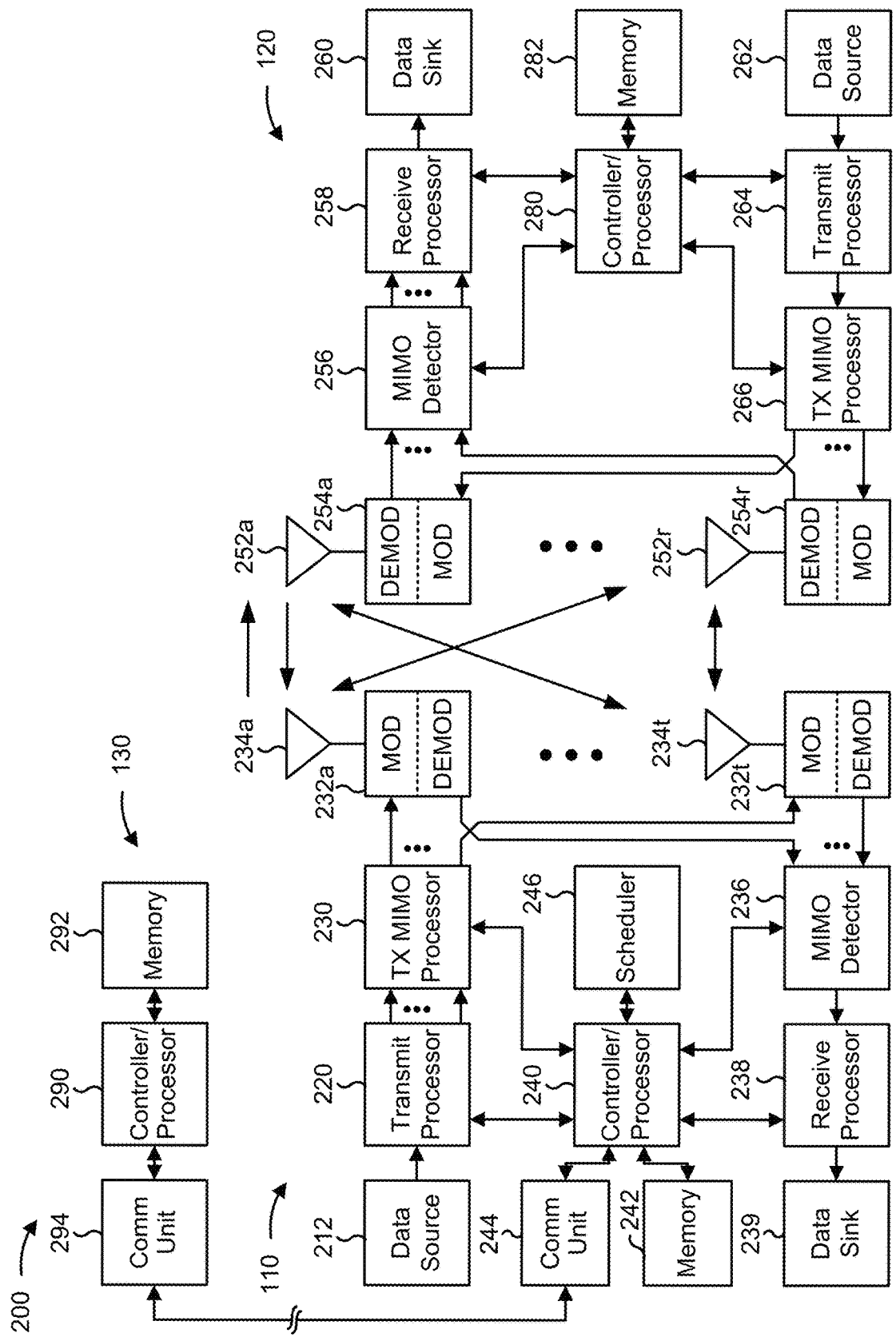
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with using timing information from a single reference signal for measurements of multiple reference signals of multiple cells, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving an indication of a single reference signal to use for determining timing information for measuring multiple reference signals from multiple cells on a common frequency layer, means for measuring the multiple reference signals based at least in part on the timing information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a single reference signal for a UE to use for determining timing information for measuring multiple reference signals from multiple cells on a common frequency layer; means for transmitting, to the UE, an indication of the single reference signal; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
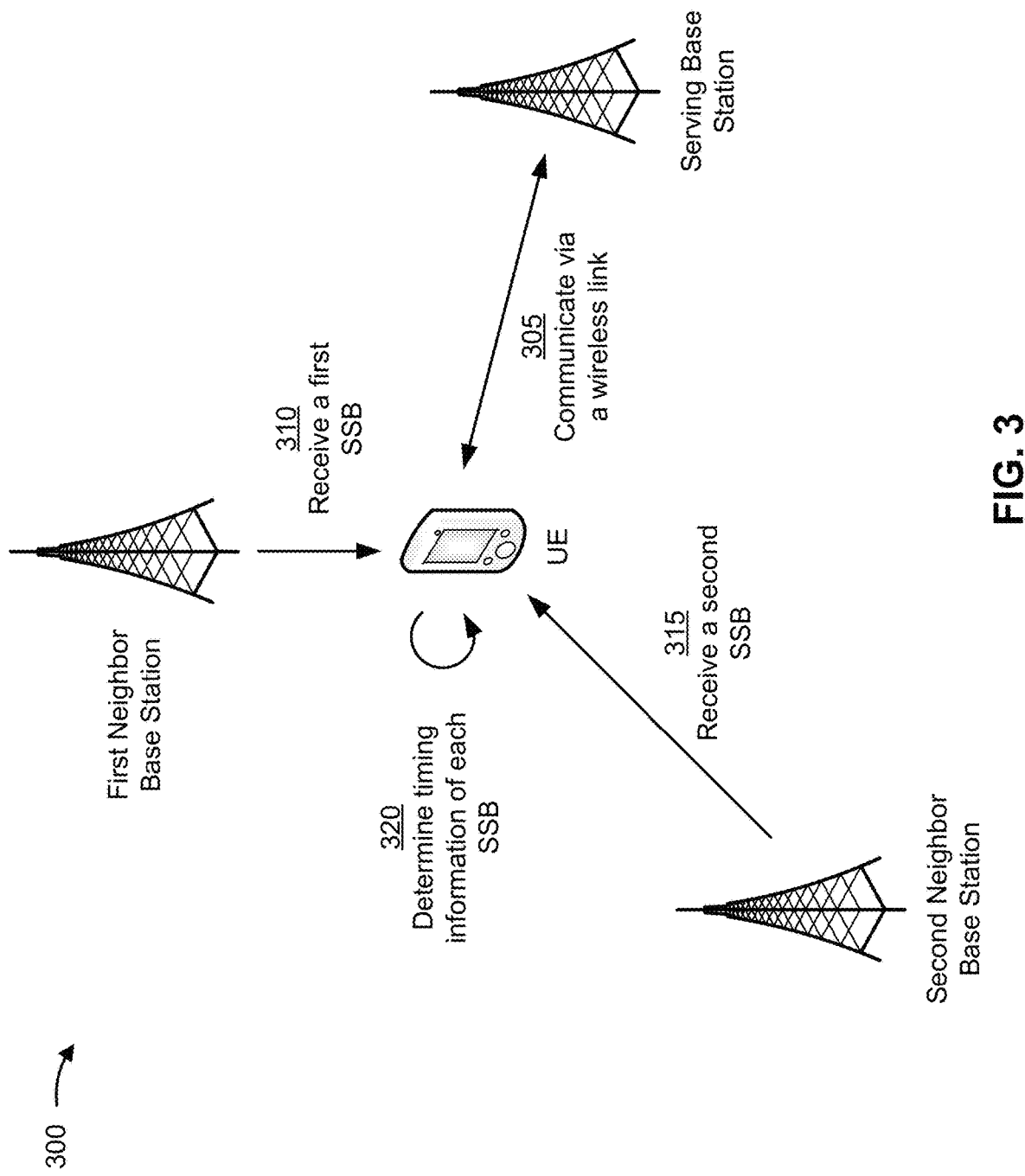
FIG. 3 is a diagram illustrating an example of a user equipment receiving synchronization signal blocks from multiple cells, in accordance with the present disclosure.

FIG. 3 is a diagram illustrating an example 300 of a UE receiving synchronization signal blocks (SSBs) from multiple cells, in accordance with the present disclosure. As shown in FIG. 3, a UE may communicate with a serving base station. The UE and the base station may be part of a wireless network that includes multiple neighbor base stations that provide neighbor cells of the wireless network.

As shown in FIG. 3, and by reference number 305, the UE may communicate (e.g., transmit uplink transmissions and/or receive downlink transmissions) with the serving base station via a wireless link. Based at least in part on measurements of reference signals from the serving base station and/or neighbor base stations, the UE may determine to measure reference signals from one or more neighbor base stations and/or perform a cell reselection process. For example, the UE may determine to measure reference signals from one or more neighbor base stations and/or perform a cell reselection process based at least in part on a determination that a reference signal receive power (RSRP) associated with the wireless link satisfies a threshold (e.g., is below the threshold).

As shown by reference number 310, the UE may receive a first SSB from a first neighbor base station (e.g., via a first neighbor cell). As shown by reference number 315, the UE may receive a second SSB from a second neighbor base station (e.g., via a second neighbor cell).

As shown by reference number 320, the UE may determine timing information of each SSB. The UE may use the first SSB to determine first timing information for receiving one or more channel state information reference signals (CSI-RSs) from the first base station. The UE may use the second SSB to determine second timing information for receiving one or more CSI-RSs from the second base station. The UE may receive additional SSBs from additional neighbor base stations (e.g., via additional neighbor cells) to determine additional timing information for receiving one or more CSI-RSs from the additional base stations.

As indicated above, FIG. 3 is provided as an example. Other examples may differ from what is described with respect to FIG. 3.

Figure 4:
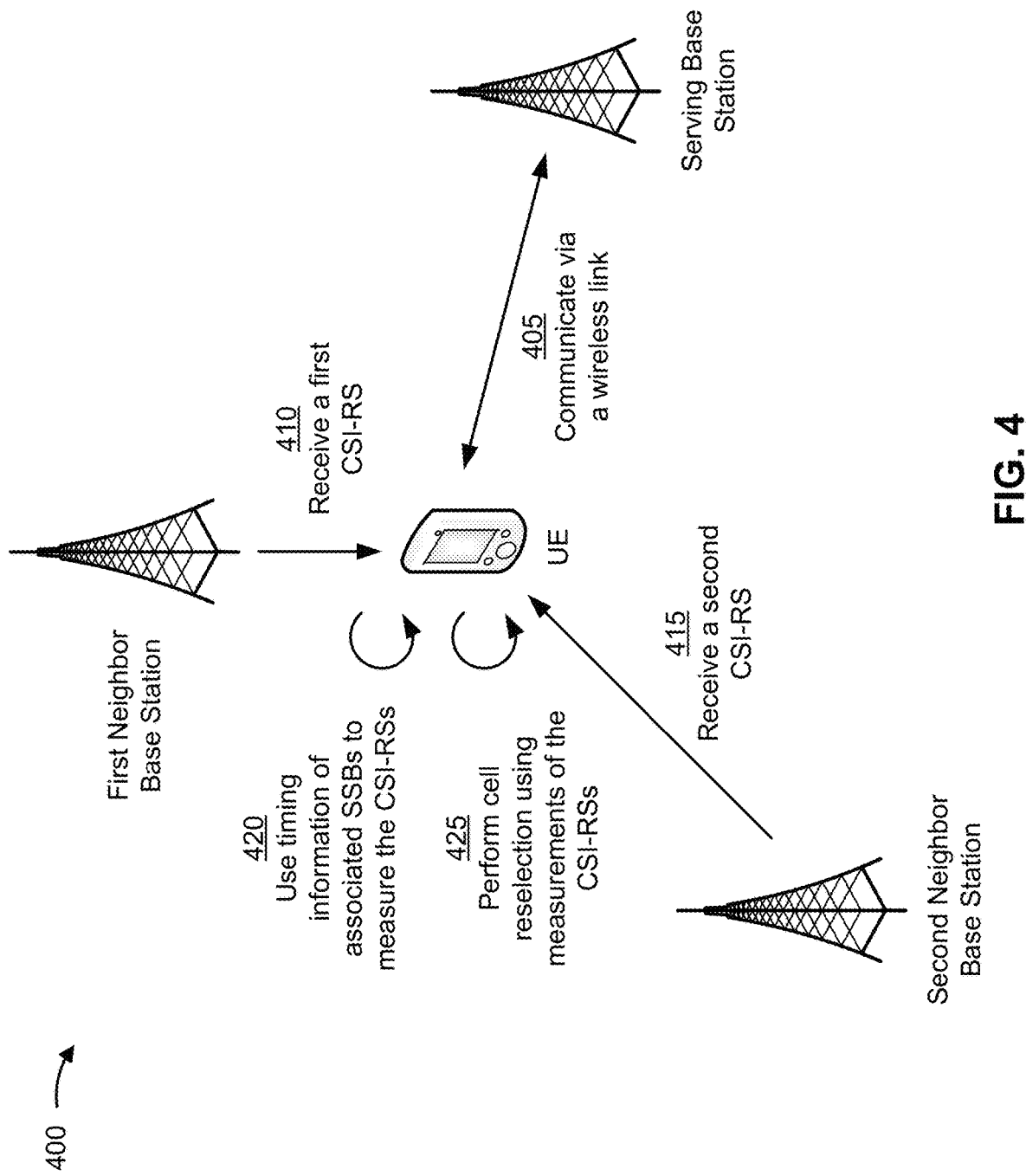
FIG. 4 is a diagram illustrating an example of a user equipment using different timing information to measure multiple channel state information reference signals from multiple cells, in accordance with the present disclosure.

FIG. 4 is a diagram illustrating an example 400 of a UE using different timing information to measure multiple CSI-RSs from multiple cells, in accordance with the present disclosure. Multiple neighbor base stations may provide the multiple cells. FIG. 4 may illustrate one or more procedures that may occur after one or more processes illustrated in FIG. 3.

As shown in FIG. 4, and by reference number 405, the UE may communicate (e.g., transmit uplink transmissions and/or receive downlink transmissions) with the serving base station via a wireless link. Based at least in part on measurements of reference signals from the serving base station and/or neighbor base stations, the UE may determine to measure reference signals from one or more neighbor base stations and/or perform a cell reselection process. For example, the UE may determine to measure CSI-RSs from one or more neighbor base stations and/or perform a cell reselection process based at least in part on a determination that an RSRP associated with the wireless link satisfies a threshold.

As shown by reference number 410, the UE may receive a first CSI-RS from a first neighbor base station via a first neighbor cell. As shown by reference number 415, the UE may receive a second CSI-RS from a second neighbor base station via a second neighbor cell. The UE may receive additional CSI-RSs from additional neighbor base stations (e.g., via additional neighbor cells).

As shown by reference number 420, the UE may use timing information of associated SSBs to measure the CSI-RSs. For example, the UE may use first timing information from a first SSB from the first neighbor base station to measure the first CSI-RS, may use second timing information from a second SSB from the second neighbor base station to measure the second CSI-RS, may use additional timing information from one or more additional SSBs from additional neighbor base stations to measure additional CSI-RSs, and/or the like.

As shown by reference number 425, the UE may perform cell reselection using measurements of the CSI-RSs. For example, the UE may measure a respective RSRP for each of the CSI-RSs, using unique timing information for each of the CSI-RSs, and determine to reselect to a neighbor cell having a highest measured RSRP. The UE may receive a plurality of SSBs and associated CSI-RSs, including from neighbor cells that are unlikely to be selected, and may consume computing, power, and communication resources to determine the unique timing information. Additionally, based at least in part on receiving many (e.g., more than 2) SSBs and associated CSI-RSs, the UE may be unable to determine timing information for one or more CSI-RSs in time to receive the CSI-RSs. This may cause the UE to reselect to a neighbor cell with incomplete information.

As indicated above, FIG. 4 is provided as an example. Other examples may differ from what is described with respect to FIG. 4.

In some aspects described herein, a UE may use an indication received from a network (e.g., via a signaling extension in a measurement object configuration) to identify timing information to use for measuring multiple reference signals (e.g., used for cell reselection). In some aspects, the UE may receive an indication of a single reference signal to use for determining the timing information for measuring the multiple reference signals from multiple cells on a common frequency layer. The UE may measure the multiple reference signals based at least in part on the timing information (e.g., a single set of timing to use for each of the multiple reference signals) instead of using unique timing information for each of the multiple reference signals. Based at least in part on the UE measuring the multiple reference signals using the same timing information, the UE may conserve computing, power, and communication resources.

Figure 5:
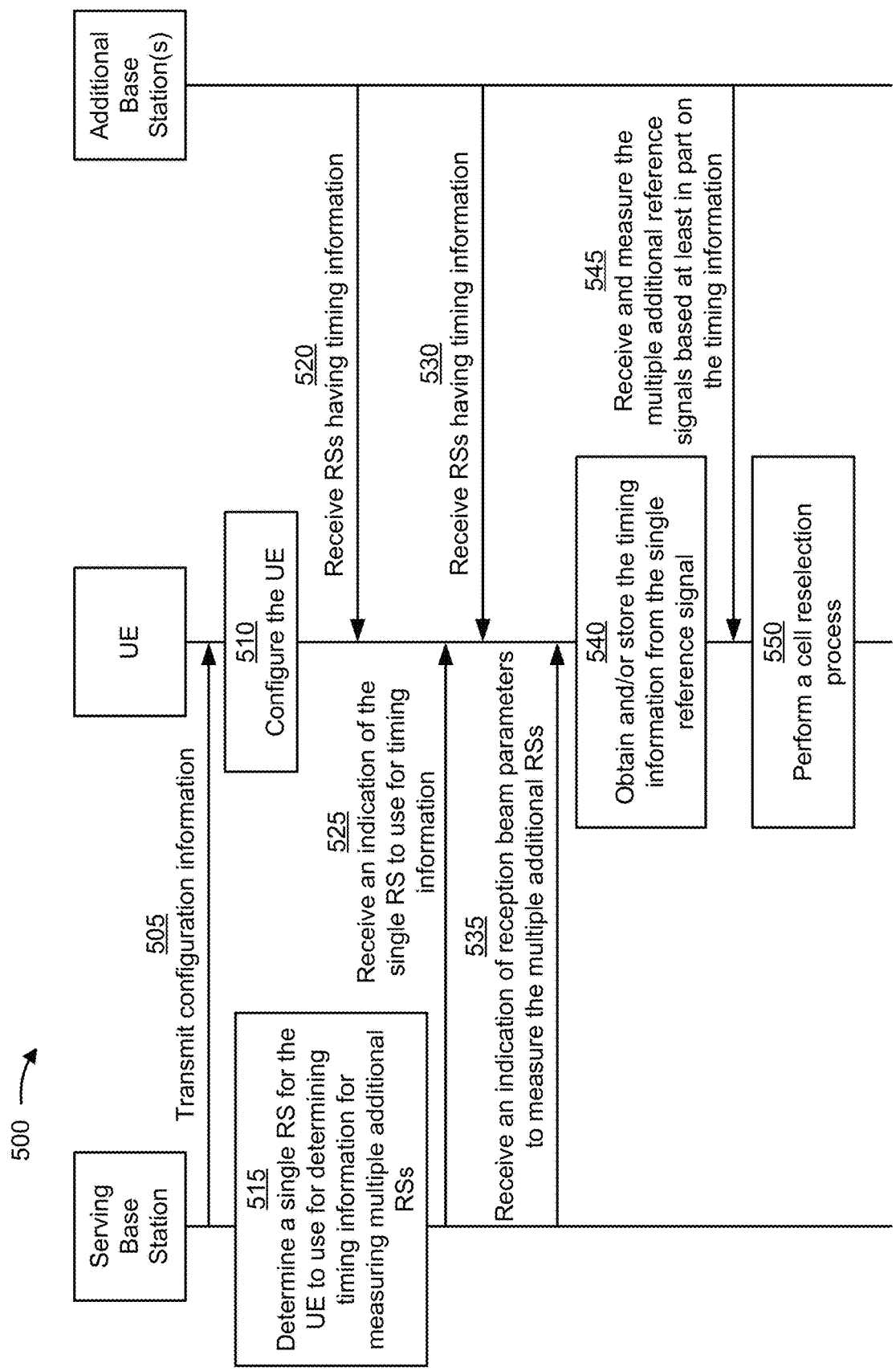
FIG. 5 is a diagram illustrating an example of a user equipment using timing information from a single reference signal for measurements of multiple reference signals of multiple cells, in accordance with the present disclosure.

FIG. 5 is a diagram illustrating an example 500 of a user equipment using timing information from a single reference signal for measurements of multiple reference signals of multiple cells, in accordance with the present disclosure. As shown in FIG. 5, a UE (e.g., UE 120) may communicate with a serving base station (e.g., base station 110). The UE and the serving base station may be part of a wireless network (e.g., wireless network 100). The wireless network may also include one or more additional base stations (e.g., additional base stations 110) that provide one or more neighbor cells.

As shown by reference number 505, the serving base station may transmit, and the UE may receive, configuration information. In some aspects, the UE may receive configuration information from another device (e.g., from another base station, another UE, a network controller, and/or the like). In some aspects, the UE may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the serving base station is to transmit an indication of a single reference signal (e.g., an SSB) for the UE to use for determining timing information for measuring multiple additional reference signals (e.g., CSI-RSs). In some aspects, the configuration information may indicate that the UE is to store information (e.g., timing information, information that the UE can use to derive timing information, and/or the like) associated with one or more reference signals (e.g., SSBs). In some aspects, the configuration information may indicate that the UE is to select, based at least in part on the indication of the single reference signal, a reference signal (e.g., SSB) of the one or more reference signals (e.g., SSBs) to use as a basis for determining timing information for measuring the multiple additional reference signals.

As shown by reference number 510, the UE may configure the UE to communicate with the serving base station, receive reference signals (e.g., SSBs) from neighbor cells, determine timing information to use to measure multiple additional reference signals (e.g., CSI-RSs), and/or the like. In some aspects, the UE may configure the UE based at least in part on the configuration information. In some aspects, the UE may be configured to perform one or more operations described herein.

As shown by reference number 515, the serving base station may determine a single reference signal for the UE to use for determining timing information for measuring multiple additional reference signals from multiple cells. In some aspects, the multiple cells may be on a common frequency layer (e.g., FR1, FR2, frequency bands within FR1 or FR2, and/or the like). In some aspects, the base station may determine the single reference signal for the UE based at least in part on a request from the UE, a determination that the UE is likely to perform cell reselection (e.g., based at least in part on an RSRP, a number of radio link failures, and/or the like), and/or the like.

In some aspects, the base station may determine which single reference signal the UE is to use for determining timing information based at least in part on a location of the UE (e.g., a geolocation of the UE, a location based at least in part on a beam used to communicate with the UE, and/or the like), a trajectory of the UE (e.g., based at least in part on tracking a geolocation of the UE, tracking beam selection for communicating with the UE, tracking reference signals of the UE, and/or the like). In some aspects, the base station may determine which single reference signal the UE is to use for determining the timing information based at least in part on a capability of the UE to support receiving the indication of the single reference signal to use for determining timing information for measuring multiple additional reference signals from multiple cells on a common frequency layer, a deployment configuration of neighbor base stations, a neighbor base station that is expected to have a highest RSRP, and/or the like.

As shown by reference number 520, the UE may receive one or more reference signals having timing information. For example, the UE may receive one or more SSBs from the additional base stations that provide neighbor cells. In some aspects, the UE may derive timing information from each of the one or more reference signals upon receipt of the one or more reference signals and store the timing information until receiving an indication of which timing information to use for measuring multiple additional reference signals. In some aspects, the UE may store information for the one or more reference signals that the UE can use to derive timing information. The UE may wait to derive the timing information until receipt of an indication of one of the reference signals to use for determining the timing information for measuring the multiple additional reference signals.

As shown by reference signal 525, the UE may receive an indication of the single reference signal to use for determining timing information for measuring multiple additional reference signals from multiple cells (e.g., on a common frequency layer). In some aspects, the serving base station may transmit, and the UE may receive, the indication via RRC signaling, a MAC CE, and/or the like.

In some aspects, the indication of the single reference signal includes an identification of the single reference signal from a set of previously received reference signals. The UE may select the timing information that is associated with the single reference signal, may derive the timing information from stored information that is associated with the single reference signal, and/or the like. In some aspects, the UE may determine to receive the single reference signal (e.g., based at least in part on the UE not having timing information associated with the single reference signal).

In some aspects, the indication of the single reference signal may include a prioritized list of reference signals from which the UE is to select the single reference signal (e.g., a highest priority reference signal) of the prioritized list of reference signals. For example, the UE may select a highest priority reference signal of the prioritized list for which the UE has timing information, or information from which timing information may be derived.

As shown by reference number 530, the UE may receive reference signals having timing information. For example, the UE may receive the reference signals having timing information based at least in part on determining that the UE does not yet have timing information, or information from which timing may be derived, associated with the single reference signal to use for timing information. In some aspects, the UE may receive the reference signals having timing information to update previously determined timing information associated with a previous occasion of the single reference signal.

As shown by reference number 535, the UE may receive an indication of reception beam parameters to measure the multiple additional reference signals. In some aspects, the reception beam parameters may indicate whether the UE is to use, for measuring the multiple additional reference signals, a default reception beam width or a narrow reception beam that is narrower than the default reception beam. In some aspects, a narrow reception beam may increase a measured RSRP for a reference signal, so long as the reference signal arrives at the UE within the narrow reception beam.

In some aspects, the reception beam parameters may indicate one or more beams to use to measure the multiple additional reference signals. In some aspects, the indication indicates the one or more reception beams based at least in part on a direction relative to a reception beam used to communicate with the serving base station (e.g., a serving cell provided by the serving base station).

As shown by reference number 540, the UE may obtain and/or store the timing information from the single reference signal. In some aspects, obtaining and/or storing the timing information from the single reference signal may include receiving the single reference signal, deriving or identifying the timing information from the single reference signal, storing the timing information for use in measuring the multiple reference signals, and/or the like.

As shown by reference number 545, the UE may receive and measure the multiple additional reference signals based at least in part on the timing information. In some aspects, multiple base stations may transmit the multiple additional reference signals. In some aspects, a single base station, of the multiple base stations, may transmit one or more additional reference signals of multiple additional reference signals. In some aspects, the multiple additional reference signals may include multiple CSI-RSs.

In some aspects, when measuring the multiple additional reference signals, the UE may measure the multiple reference signals based at least in part on application of the timing information to the multiple additional reference signals, determining RSRPs and/or noise levels for the multiple additional reference signals, and/or the like.

As shown by reference number 550, the UE may perform a cell reselection process. For example, the UE may choose a neighbor cell for cell reselection based at least in part on measurements (e.g., RSRPs) of the multiple reference signals.

Based at least in part on the UE measuring the multiple reference signals from the one or more additional base stations using the same timing information, the UE may conserve computing, power, and communication resources. Additionally, or alternatively, based at least in part on the base station providing the indication of which reference signal to use for timing information, the UE may use timing information that is likely (e.g., based at least in part on information known to the base station) to improve an ability of the UE to receive a reference signal from a neighbor base station that is expected to have a highest RSRP.

As indicated above, FIG. 5 is provided as an example. Other examples may differ from what is described with respect to FIG. 5.

Figure 6:
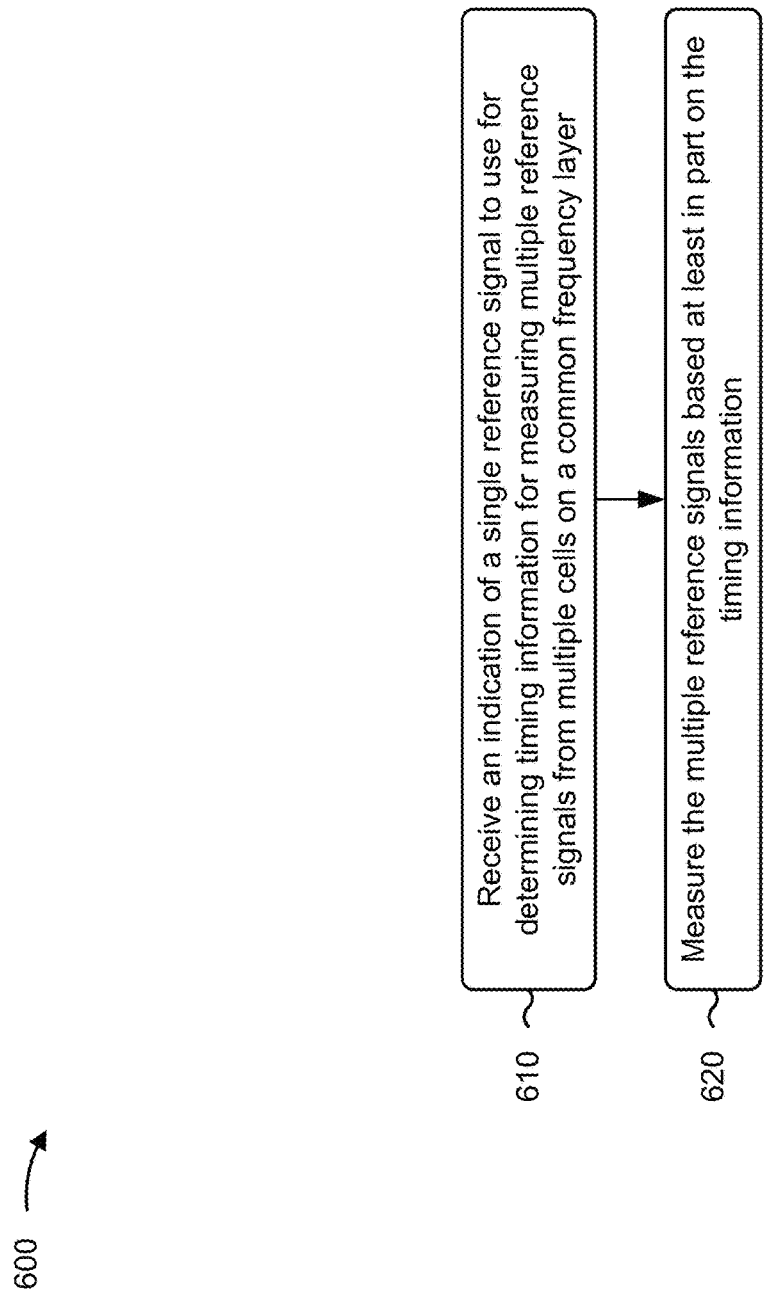
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with using timing information from a single reference signal for measurements of multiple reference signals of multiple cells.

As shown in FIG. 6, in some aspects, process 600 may include receiving an indication of a single reference signal to use for determining timing information for measuring multiple reference signals from multiple cells on a common frequency layer (block 610). For example, the UE (e.g., using receive processor 258, controller/processor 280, memory 282, and/or the like) may receive an indication of a single reference signal to use for determining timing information for measuring multiple reference signals from multiple cells on a common frequency layer, as described above.

As further shown in FIG. 6, in some aspects, process 600 may include measuring the multiple reference signals based at least in part on the timing information (block 620). For example, the UE (e.g., using receive processor 258, transmit processor 264, controller/processor 280, memory 282, and/or the like) may measure the multiple reference signals based at least in part on the timing information, as described above.

Process 600 may include additional aspects, such as any single aspect or any combination of aspects described below and/or in connection with one or more other processes described elsewhere herein.

In a first aspect, the single reference signal is a previously received reference signal, and the indication of the single reference signal includes an identification of the single reference signal from a set of previously received reference signals.

In a second aspect, alone or in combination with the first aspect, determining timing information includes receiving the single reference signal, deriving or identifying the timing information from the single reference signal, and storing the timing information for use in measuring the multiple reference signals.

In a third aspect, alone or in combination with one or more of the first and second aspects, process 600 includes receiving an additional indication of whether the UE is to use, for measuring the multiple reference signals, a default reception beam or a narrow reception beam that is narrower than the default reception beam, wherein is measuring the multiple reference signals includes measuring the multiple reference signals using, based at least in part on the additional indication, the default reception beam or the narrow reception beam.

In a fourth aspect, alone or in combination with one or more of the first through third aspects, process 600 includes receiving an additional indication of one or more reception beams to use for measuring the multiple reference signals.

In a fifth aspect, alone or in combination with one or more of the first through fourth aspects, the additional indication indicates the one or more reception beams based at least in part on a direction relative to a reception beam used to communicate with a serving cell.

In a sixth aspect, alone or in combination with one or more of the first through fifth aspects, the single reference signal includes a single SSB.

In a seventh aspect, alone or in combination with one or more of the first through sixth aspects, the multiple reference signals include multiple CSI-RSs transmitted by multiple base stations.

In an eighth aspect, alone or in combination with one or more of the first through seventh aspects, receiving the indication of the single reference signal includes receiving a prioritized list of reference signals, the single reference signal is a highest priority reference signal, of the prioritized list of reference signals, for which timing information is available to the UE.

In a ninth aspect, alone or in combination with one or more of the first through eighth aspects, measuring the multiple reference signals includes measuring the multiple reference signals based at least in part on application of the timing information to the multiple reference signals, and determining one or more of RSRPs or noise levels for the multiple reference signals.

In a tenth aspect, alone or in combination with one or more of the first through ninth aspects, process 600 includes performing a cell reselection process based at least in part on measurements of the multiple reference signals.

In an eleventh aspect, alone or in combination with one or more of the first through tenth aspects, receiving the indication of the single reference signal includes receiving the indication via one or more of RRC signaling or a MAC CE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
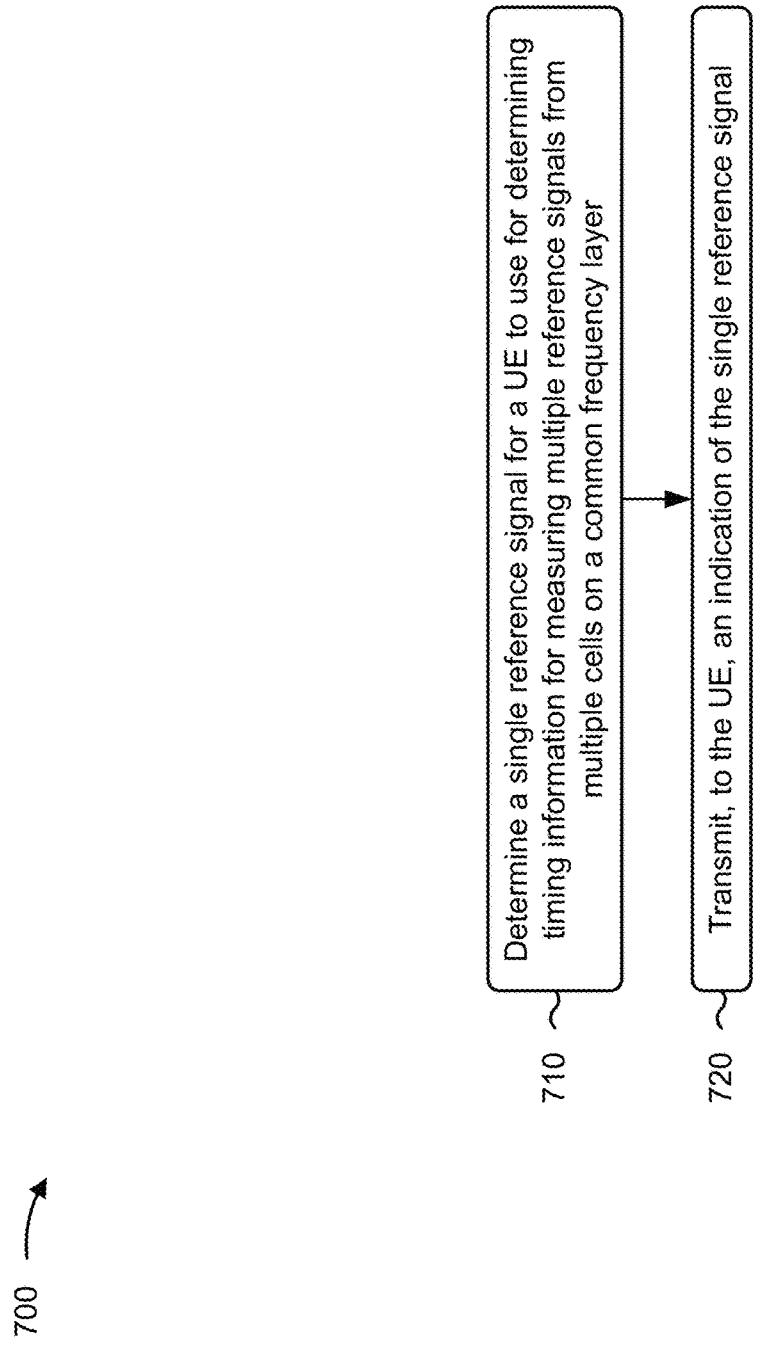
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with using timing information from a single reference signal for measurements of multiple reference signals of multiple cells.

As shown in FIG. 7, in some aspects, process 700 may include determining a single reference signal for a UE to use for determining timing information for measuring multiple reference signals from multiple cells on a common frequency layer (block 710). For example, the base station (e.g., using transmit processor 220, receive processor 238, controller/processor 240, memory 242, and/or the like) may determine a single reference signal for a UE to use for determining timing information for measuring multiple reference signals from multiple cells on a common frequency layer, as described above.

As further shown in FIG. 7, in some aspects, process 700 may include transmitting, to the UE, an indication of the single reference signal (block 720). For example, the base station (e.g., using transmit processor 220, controller/processor 240, memory 242, and/or the like) may transmit, to the UE, an indication of the single reference signal, as described above.

Process 700 may include additional aspects, such as any single aspect or any combination of aspects described below and/or in connection with one or more other processes described elsewhere herein.

In a first aspect, determining the single reference signal is based at least in part on one or more of a location of the UE, a trajectory of the UE, a capability of the UE to support receiving the indication of the single reference signal to use for determining timing information for measuring multiple reference signals from multiple cells on a common frequency layer, a deployment configuration of neighbor base stations, a neighbor base station that is expected to have a highest RSRP.

In a second aspect, alone or in combination with the first aspect, the indication of the single reference signal includes an identification of the single reference signal from a set of reference signals transmitted from one or more base stations.

In a third aspect, alone or in combination with one or more of the first and second aspects, process 700 includes transmitting an additional indication of whether the UE is to use, for measuring the multiple reference signals, a default reception beam or a narrow reception beam that is narrower than the default reception beam.

In a fourth aspect, alone or in combination with one or more of the first through third aspects, process 700 includes transmitting an additional indication of one or more reception beams to use for measuring the multiple reference signals.

In a fifth aspect, alone or in combination with one or more of the first through fourth aspects, the additional indication indicates the one or more reception beams based at least in part on a direction relative to a reception beam used to communicate with the UE.

In a sixth aspect, alone or in combination with one or more of the first through fifth aspects, the single reference signal includes a single SSB.

In a seventh aspect, alone or in combination with one or more of the first through sixth aspects, the multiple reference signals include multiple CSI-RSs transmitted by multiple base stations.

In an eighth aspect, alone or in combination with one or more of the first through seventh aspects, transmitting the indication of the single reference signal includes transmitting a prioritized list of reference signals, the single reference signal is a highest priority reference signal, of the prioritized list of reference signals, for which timing information is available to the UE.

In a ninth aspect, alone or in combination with one or more of the first through eighth aspects, transmitting the indication of the single reference signal includes transmitting the indication via one or more of RRC signaling or a MAC CE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
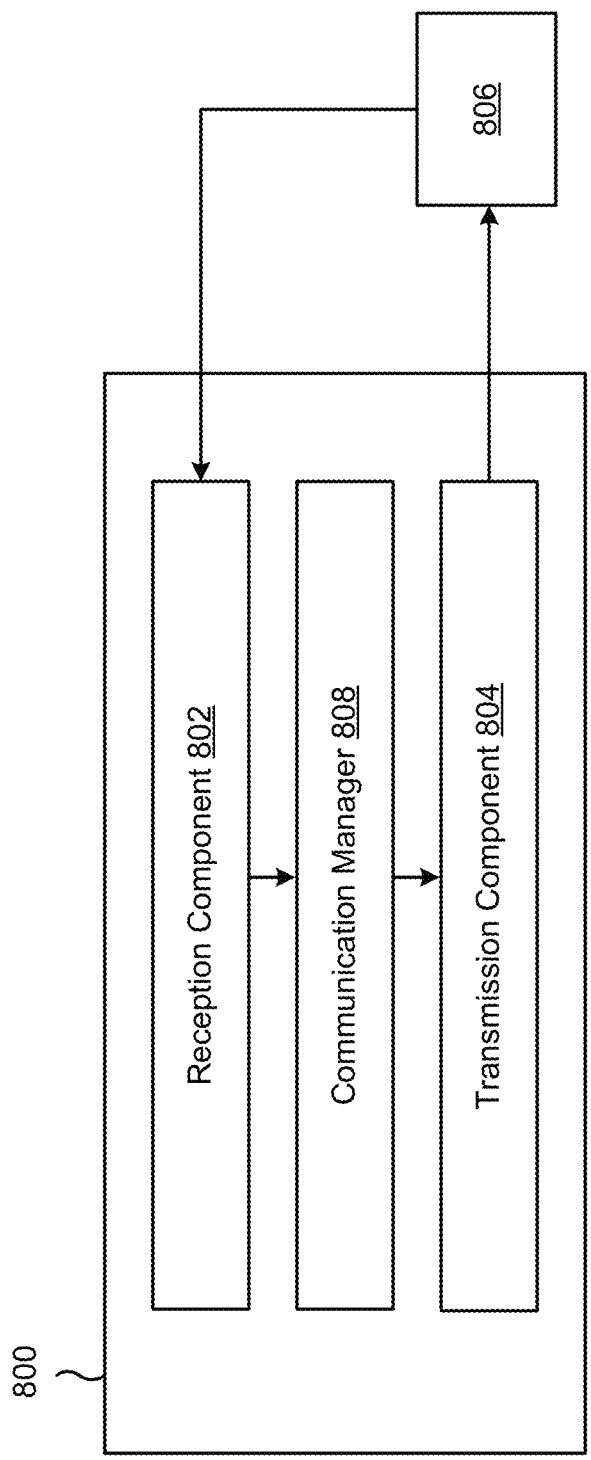
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive an indication of a single reference signal to use for determining timing information for measuring multiple reference signals from multiple cells on a common frequency layer. The communication manager 808 may measure the multiple reference signals based at least in part on the timing information.

The reception component 802 may receive an additional indication of whether the UE is to use, for measuring the multiple reference signals, a default reception beam or a narrow reception beam that is narrower than the default reception beam wherein measuring the multiple reference signals comprises: measuring the multiple reference signals using, based at least in part on the additional indication, the default reception beam or the narrow reception beam.

The reception component 802 may receive an additional indication of one or more reception beams to use for measuring the multiple reference signals.

The communication manager 808 may perform a cell reselection process based at least in part on measurements of the multiple reference signals.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
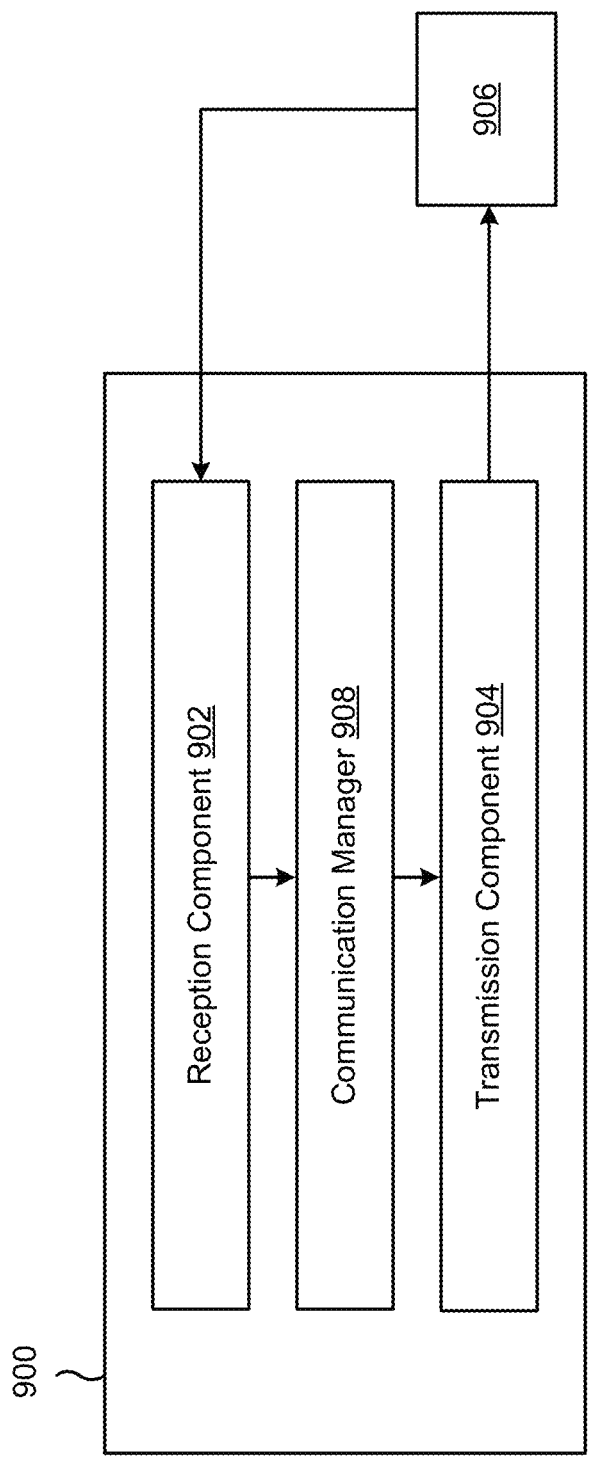
FIG. 9 is a block diagram of an example apparatus for wireless communication, in accordance with the present disclosure.

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The communication manager 908 may determine a single reference signal for a user equipment (UE) to use for determining timing information for measuring multiple reference signals from multiple cells on a common frequency layer. The transmission component 904 may transmit, to the UE, an indication of the single reference signal.

The transmission component 904 may transmit an additional indication of whether the UE is to use, for measuring the multiple reference signals, a default reception beam or a narrow reception beam that is narrower than the default reception beam.

The transmission component 904 may transmit an additional indication of one or more reception beams to use for measuring the multiple reference signals.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving an indication of a single reference signal to use for determining timing information for measuring multiple reference signals from multiple cells on a common frequency layer; and measuring the multiple reference signals based at least in part on the timing information.

Aspect 2: The method of Aspect 1, wherein the single reference signal is a previously received reference signal, and wherein the indication of the single reference signal comprises: an identification of the single reference signal from a set of previously received reference signals.

Aspect 3: The method of any of Aspects 1-2, wherein determining timing information comprises: receiving the single reference signal, deriving or identifying the timing information from the single reference signal, and storing the timing information for use in measuring the multiple reference signals.

Aspect 4: The method of any of Aspects 1-3, further comprising: receiving an additional indication of whether the UE is to use, for measuring the multiple reference signals, a default reception beam or a narrow reception beam that is narrower than the default reception beam, wherein measuring the multiple reference signals comprises: measuring the multiple reference signals using, based at least in part on the additional indication, the default reception beam or the narrow reception beam.

Aspect 5: The method of any of Aspects 1-4, further comprising: receiving an additional indication of one or more reception beams to use for measuring the multiple reference signals.

Aspect 6: The method of Aspect 5, wherein the additional indication indicates the one or more reception beams based at least in part on a direction relative to a reception beam used to communicate with a serving cell.

Aspect 7: The method of any of Aspects 1-6, wherein the single reference signal comprises: a single synchronization signal block.

Aspect 8: The method of any of Aspects 1-6, wherein the multiple reference signals comprise: multiple channel state information reference signals transmitted by multiple base stations.

Aspect 9: The method of any of Aspects 1-8, wherein receiving the indication of the single reference signal comprises: receiving a prioritized list of reference signals, wherein the single reference signal is a highest priority reference signal, of the prioritized list of reference signals, for which timing information is available to the UE.

Aspect 10: The method of any of Aspects 1-9, wherein measuring the multiple reference signals comprises: measuring the multiple reference signals based at least in part on application of the timing information to the multiple reference signals; and determining one or more of reference signal receive powers or noise levels for the multiple reference signals.

Aspect 11: The method of any of Aspects 1-10, further comprising: performing a cell reselection process based at least in part on measurements of the multiple reference signals.

Aspect 12: The method of any of Aspects 1-11, wherein receiving the indication of the single reference signal comprises: receiving the indication via one or more of radio resource control signaling or a medium access control element.

Aspect 13: A method of wireless communication performed by a base station, comprising: determining a single reference signal for a user equipment (UE) to use for determining timing information for measuring multiple reference signals from multiple cells on a common frequency layer; and transmitting, to the UE, an indication of the single reference signal.

Aspect 14: The method of Aspect 13, wherein determining the single reference signal is based at least in part on one or more of: a location of the UE, a trajectory of the UE, a capability of the UE to support receiving the indication of the single reference signal to use for determining timing information for measuring multiple reference signals from multiple cells on a common frequency layer, a deployment configuration of neighbor base stations, or a neighbor base station that is expected to have a highest reference signal receive power.

Aspect 15: The method of any of Aspects 13-14, wherein the indication of the single reference signal comprises: an identification of the single reference signal from a set of reference signals transmitted from one or more base stations.

Aspect 16: The method of any of Aspects 13-15, further comprising: transmitting an additional indication of whether the UE is to use, for measuring the multiple reference signals, a default reception beam or a narrow reception beam that is narrower than the default reception beam.

Aspect 17: The method of any of Aspects 13-16, further comprising: transmitting an additional indication of one or more reception beams to use for measuring the multiple reference signals.

Aspect 18: The method of Aspect 17, wherein the additional indication indicates the one or more reception beams based at least in part on a direction relative to a reception beam used to communicate with the UE.

Aspect 19: The method of any of Aspects 13-18, wherein the single reference signal comprises: a single synchronization signal block.

Aspect 20: The method of any of Aspects 13-18, wherein the multiple reference signals comprise: multiple channel state information reference signals transmitted by multiple base stations.

Aspect 21: The method of Aspect 13, wherein transmitting the indication of the single reference signal comprises: transmitting a prioritized list of reference signals, wherein the single reference signal is a highest priority reference signal, of the prioritized list of reference signals, for which timing information is available to the UE.

Aspect 22: The method of any of Aspects 13-21, wherein transmitting the indication of the single reference signal comprises: transmitting the indication via one or more of radio resource control signaling or a medium access control element.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories storing processor-readable code; and
   one or more processors coupled to the one or more memories, at least one of the one or more processors being operable to cause the UE to:
      receive an identification of a single reference signal to select the single reference signal from a set of previously received reference signals or a prioritized list of reference signals; and
      measure multiple reference signals, from multiple cells on a common frequency layer, using timing information associated with the single reference signal.

2. The UE of claim 1, wherein the single reference signal is a previously received reference signal.

3. The UE of claim 1, wherein the at least one of the one or more processors is further operatable to cause the UE to:
   receive the single reference signal,
   derive or identify the timing information from the single reference signal, and
   store the timing information for use in measuring the multiple reference signals.

4. The UE of claim 1, wherein the at least one of the one or more processors is further operable to cause the UE to:
   receive an indication of whether the UE is to use, for measuring the multiple reference signals, a default reception beam or a narrow reception beam that is narrower than the default reception beam,
      wherein the at least one of the one or more processors, to measure the multiple reference signals, is operable to cause the UE to:
         measure the multiple reference signals using the default reception beam or the narrow reception beam.

5. The UE of claim 1, wherein the at least one of the one or more processors is further operable to cause the UE to:
   receive an indication of one or more reception beams to use for measuring the multiple reference signals.

6. The UE of claim 5, wherein the indication indicates the one or more reception beams associated with a direction relative to a reception beam used to communicate with a serving cell.

7. The UE of claim 1, wherein the single reference signal comprises:
   a single synchronization signal block.

8. The UE of claim 1, wherein the multiple reference signals comprise:
   multiple channel state information reference signals transmitted by multiple base stations.

9. The UE of claim 1, wherein the identification of the single reference signal includes the prioritized list of reference signals, the single reference signal being a highest priority reference signal, of the prioritized list of reference signals, for which timing information is available to the UE.

10. The UE of claim 1, wherein the at least one of the one or more processors, to measure the multiple reference signals, is further operable to cause the UE to:
   measure the multiple reference signals according to application of the timing information to the multiple reference signals, wherein the multiple reference signals are associated with one or more of reference signal receive powers or one or more of reference signal noise levels.

11. The UE of claim 1, wherein the at least one of the one or more processors is further operable to cause the UE to:
   perform a cell reselection process according to measurements of the multiple reference signals.

12. The UE of claim 1, wherein the at least one of the one or more processors, to receive the identification of the single reference signal, is further operable to cause the UE to:
   receive the identification via one or more of radio resource control signaling or a medium access control control element.

13. A base station for wireless communication, comprising:
   one or more memories storing processor-readable code; and
   one or more processors coupled to the one or more memories, at least one of the one or more processors being operable to cause the base station to:
      transmit, to a user equipment (UE)-, configuration information indicating that the base station is to transmit an identification of a single reference signal associated with timing information for measuring multiple reference signals from multiple cells on a common frequency layer; and
      transmit, to the UE, the identification of the single reference signal to select the single reference signal from a set of previously transmitted reference signals or a prioritized list of reference signals.

14. The base station of claim 13, wherein the single reference signal is associated with one or more of:
- a location of the UE,
- a trajectory of the UE, signal,
- a capability of the UE to support receiving the identification of the single reference
- a deployment configuration of neighbor base stations, or
- a neighbor base station that is expected to have a highest reference signal receive power.

15. The base station of claim 13, wherein the set of previously transmitted reference signals is from the base station.

16. The base station of claim 13, wherein the at least one of the one or more processors is further operable to cause the base station to:
- transmit an indication of whether the UE is to use, for measuring the multiple reference signals, a default reception beam or a narrow reception beam that is narrower than the default reception beam.

17. The base station of claim 13, wherein the at least one of the one or more processors are further operable to cause the base station to:
- transmit an indication of one or more reception beams to use for measuring the multiple reference signals.

18. The base station of claim 17, wherein the indication indicates the one or more reception beams associated with a direction relative to a reception beam used to communicate with the UE.

19. The base station of claim 13, wherein the single reference signal comprises:
- a single synchronization signal block.

20. The base station of claim 13, wherein the multiple reference signals comprise:
- multiple channel state information reference signals transmitted by multiple base stations.

21. The base station of claim 13, wherein the identification of the single reference signal includes the prioritized list of reference signals, the single reference signal being a highest priority reference signal, of the prioritized list of reference signals, for which timing information is available to the UE.

22. The base station of claim 13, wherein the at least one of the one or more processors, to transmit the identification of the single reference signal, is operable to:
- transmit the identification via one or more of radio resource control signaling or a medium access control control element.

23. A method of wireless communication performed at a user equipment (UE), comprising:
- receiving an identification of a single reference signal to select the single reference signal from a set of previously received reference signals; and
- measuring multiple reference signals, from multiple cells on a common frequency layer, using timing information associated with the single reference signal.

24. The method of claim 23, wherein the identification of the single reference signal is from a set of previously received reference signals.

25. The method of claim 23, wherein measuring the multiple reference signals comprises:
- measuring the multiple reference signals according to application of the timing information to the multiple reference signals wherein the multiple reference signals are associated with one or more of reference signal receive powers or one or more of reference signal noise levels.

26. The method of claim 23, further comprising:
- performing a cell reselection process according to measurements of the multiple reference signals.

27. A method of wireless communication performed at a base station, comprising:
- transmitting, to a user equipment (UE), configuration information indicating that the base station is to transmit an identification of a single reference signal associated with timing information for measuring multiple reference signals from multiple cells on a common frequency layer; and
- transmitting, to the UE, the identification of the single reference signal to select the single reference signal from a set of previously transmitted reference signals or prioritized list of reference signals.

28. The method of claim 27, wherein the single reference signal is associated with one or more of:
- a location of the UE,
- a trajectory of the UE,
- a capability of the UE to support receiving the identification of the single reference signal,
- a deployment configuration of neighbor base stations, or
- a neighbor base station that is expected to have a highest reference signal receive power.

29. The method of claim 27, wherein the set of previously transmitted reference signals is from the base station.

30. The method of claim 27, wherein the identification of the single reference signal includes the prioritized list of reference signals, wherein the single reference signal being a highest priority reference signal, of the prioritized list of reference signals, for which timing information is available to the UE.

* * * * *